(12) United States Patent
Lalancette et al.

(10) Patent No.: US 7,757,875 B2
(45) Date of Patent: Jul. 20, 2010

(54) PULL OUT EXTENSION CONTAINED IN ELECTRICAL BOX

(75) Inventors: Daniel Lalancette, St-Jean-sur Richelieu (CA); Ioan Liviu Lupsa, Dollard-des-Ormeaux (CA)

(73) Assignee: Thomas & Betts International, Inc., Wilmington, DE (US)

( * ) Notice: Subject to any disclaimer, the term of this patent is extended or adjusted under 35 U.S.C. 154(b) by 911 days.

(21) Appl. No.: 11/475,570

(22) Filed: Jun. 23, 2006

(65) Prior Publication Data
US 2007/0045308 A1 Mar. 1, 2007

Related U.S. Application Data (60) Provisional application No. 60/713,121, filed on Aug. 31, 2005.

(51) Int. Cl.
*H02G 3/08* (2006.01)
*B65D 6/00* (2006.01)
*H02G 3/12* (2006.01)

(52) U.S. Cl. .................... 220/4.02; 220/3.94; 220/4.03; 220/4.26; 220/3.7

(58) Field of Classification Search ................ 220/4.02, 220/4.03, 4.26, 62, 3.7, 3.94
See application file for complete search history.

(56) References Cited

U.S. PATENT DOCUMENTS

| | | | | |
|---|---|---|---|---|
| 782,417 A * | 2/1905 | Robb | ................... | 220/3.94 |
| 1,161,739 A | 11/1915 | Smith | | |
| 1,655,793 A * | 1/1928 | McCrery | ................... | 220/4.28 |
| 2,510,745 A | 6/1950 | Kilgore | | |
| 2,514,745 A | 7/1950 | Dalzell | | |
| 2,544,232 A * | 3/1951 | Kennedy | ................... | 220/3.94 |
| 2,757,817 A | 8/1956 | Egan | | |
| 2,771,208 A * | 11/1956 | Chovanes | ................... | 220/4.03 |
| 2,878,956 A * | 3/1959 | Chovanes | ................... | 220/4.03 |
| 2,904,208 A * | 9/1959 | Woolfolk | ................... | 220/4.03 |
| 2,983,399 A | 5/1961 | Slater et al. | | |
| 3,115,265 A * | 12/1963 | Mulkey et al. | ................ | 220/3.5 |
| 3,343,704 A | 9/1967 | Terry | | |
| 3,609,210 A | 9/1971 | Guritz | | |
| 3,689,626 A | 9/1972 | Scott | | |
| 3,917,899 A | 11/1975 | Oliver | | |
| 4,098,423 A | 7/1978 | Marrero | | |
| 4,109,095 A | 8/1978 | Kling et al. | | |
| 4,135,633 A * | 1/1979 | Lockwood et al. | ......... | 220/3.94 |
| 4,145,857 A | 3/1979 | Tilsen | | |
| 4,276,730 A | 7/1981 | Lewis | | |
| 4,320,606 A | 3/1982 | GangaRao | | |

(Continued)

FOREIGN PATENT DOCUMENTS

CA 2129595 4/1999

(Continued)

*Primary Examiner*—Anthony Stashick
*Assistant Examiner*—Niki M Eloshway
(74) *Attorney, Agent, or Firm*—Hoffman & Baron, LLP (57) ABSTRACT

An electrical outlet box extension comprising a perimetrical side wall with an inner surface and an outer surface having an open front face and an open rear face and defining an interior space, and having at least one outwardly protruding resilient tab located on the side wall outer surface. The box extension is designed for adjustable insertable receipt within an electrical outlet box for increasing the depth of the box.

10 Claims, 6 Drawing Sheets

U.S. PATENT DOCUMENTS

| | | | |
|---|---|---|---|
| 4,331,832 A | | 5/1982 | Curtis et al. |
| 4,424,407 A | | 1/1984 | Barbic |
| 4,443,654 A | | 4/1984 | Flachbarth et al. |
| 4,458,460 A | | 7/1984 | Kohaut |
| 4,460,214 A | * | 7/1984 | Kuhns ................. 296/33 |
| 4,505,403 A | | 3/1985 | Bowden, Jr. et al. |
| 4,548,007 A | | 10/1985 | Newman |
| 4,572,368 A | * | 2/1986 | Miller et al. ............ 206/708 |
| 4,603,789 A | | 8/1986 | Medlin, Sr. |
| 4,603,932 A | | 8/1986 | Heverly |
| 4,605,817 A | | 8/1986 | Lopez |
| 4,634,015 A | * | 1/1987 | Taylor .................. 220/3.7 |
| 4,674,646 A | | 6/1987 | Teron |
| 4,734,971 A | * | 4/1988 | Dupasquier ............ 29/417 |
| 4,803,307 A | | 2/1989 | Shotey |
| 4,918,259 A | | 4/1990 | Hanson |
| 4,931,597 A | | 6/1990 | Kimbrough et al. |
| 4,988,832 A | | 1/1991 | Shotey |
| 5,012,043 A | | 4/1991 | Seymour |
| 5,042,673 A | | 8/1991 | McShane |
| 5,088,246 A | | 2/1992 | Brown |
| 5,117,996 A | | 6/1992 | McShane |
| 5,119,606 A | | 6/1992 | Graham |
| 5,169,013 A | | 12/1992 | Lammens, Jr. |
| 5,171,939 A | | 12/1992 | Shotey |
| 5,222,338 A | | 6/1993 | Hull et al. |
| 5,248,122 A | | 9/1993 | Graham |
| 5,293,003 A | | 3/1994 | Prairie, Jr. |
| 5,301,826 A | * | 4/1994 | Sandahl ................. 220/4.26 |
| 5,350,884 A | | 9/1994 | Littrell |
| 5,402,902 A | * | 4/1995 | Bouley ................. 220/3.2 |
| 5,420,376 A | | 5/1995 | Rajecki et al. |
| 5,434,359 A | | 7/1995 | Schnell |
| RE35,075 E | | 10/1995 | Lammens, Jr. |
| 5,466,886 A | | 11/1995 | Lengyel et al. |
| 5,509,560 A | | 4/1996 | Nash |
| 5,542,347 A | * | 8/1996 | Joseph ................. 99/422 |
| 5,553,730 A | | 9/1996 | Kohnen |
| 5,661,264 A | | 8/1997 | Reiker |
| 5,679,924 A | | 10/1997 | Young et al. |
| 5,683,005 A | | 11/1997 | Mordick |
| 5,778,625 A | | 7/1998 | Druffel et al. |
| 5,831,212 A | | 11/1998 | Whitehead et al. |
| 5,883,331 A | | 3/1999 | Reiker |
| 5,906,287 A | | 5/1999 | Kohnen |
| 5,931,325 A | | 8/1999 | Filipov |
| 5,950,396 A | | 9/1999 | Fosdick, Jr. |
| 5,967,354 A | | 10/1999 | Whitehead et al. |
| 6,061,983 A | | 5/2000 | McCleskey |
| 6,096,972 A | | 8/2000 | Bowman et al. |
| 6,098,825 A | | 8/2000 | Kohnen |
| 6,103,972 A | * | 8/2000 | Hagarty ................. 174/53 |
| 6,112,927 A | | 9/2000 | Gretz |
| 6,167,671 B1 | | 1/2001 | Wilson |
| 6,172,298 B1 | | 1/2001 | Norvelle |
| 6,207,894 B1 | | 3/2001 | Reiker |
| 6,239,368 B1 | | 5/2001 | Gretz |
| 6,307,154 B1 | | 10/2001 | Gretz |
| 6,346,674 B1 | | 2/2002 | Gretz |
| 6,369,322 B1 | * | 4/2002 | Gretz ................. 174/50 |
| 6,578,321 B2 | | 6/2003 | Layne |
| 6,737,576 B1 | | 5/2004 | Dinh |
| 6,820,760 B2 | | 11/2004 | Wegner et al. |
| 6,858,802 B2 | | 2/2005 | Hagarty et al. |
| 6,891,104 B2 | * | 5/2005 | Dinh ................. 174/67 |
| 6,900,386 B2 | * | 5/2005 | Chung ................. 174/502 |
| 7,273,982 B1 | * | 9/2007 | Lalancette ............ 174/58 |
| 2003/0066832 A1 | * | 4/2003 | Kipka et al. ............ 220/4.02 |
| 2004/0206536 A1 | | 10/2004 | Yip, Jr. |

FOREIGN PATENT DOCUMENTS

| | | |
|---|---|---|
| CA | 2296872 | 7/2000 |
| CA | 2480655 | 10/2003 |
| CA | 2477213 | 3/2005 |
| CA | 2472915 | 4/2005 |
| DE | 94 08 437.8 | 5/1994 |
| GB | 715944 | 9/1954 |
| GB | 1161739 | 8/1969 |
| GB | 1344590 | 1/1974 |
| GB | 1355184 | 6/1974 |
| GB | 2248866 A | 4/1992 |
| JP | 10 077 711 | 3/1998 |
| WO | WO 91/12461 | 8/1991 |
| WO | WO 00/14760 | 3/2000 |
| WO | WO 03/085792 A1 | 10/2003 |
| WO | WO 03/104587 A1 | 12/2003 |

* cited by examiner

PULL OUT EXTENSION CONTAINED IN ELECTRICAL BOX

CROSS-REFERENCE TO RELATED APPLICATION

This application claims priority to U.S. Provisional Patent Application No. 60/713,121, filed on Aug. 31, 2005, which is incorporated herein by reference.

FIELD OF THE INVENTION

The present invention relates generally to a pull out extension contained in an electrical outlet box for housing electrical fixtures such as a switch or a receptacle. More particularly, the present invention relates to an extension for increasing the depth of an electrical box in certain applications such as for use on a concrete wall.

BACKGROUND OF THE INVENTION

It has long been known to house electrical fixtures such as switches and receptacles in an electrical outlet box. The outlet box permits the insertion of electrical wires into the box which are terminated to electrical fixtures. The fixtures then may be mounted to the box which provides protection to the fixtures as well as the wires terminated therein. The outlet box is then mounted to a wall at a convenient location to provide access. Most outlet boxes accommodate one or more electrical fixtures, which terminate standard 110 volt electrical wires.

Outlet boxes are available in a variety of configurations and sizes. The selection of which type of box to use is dependant upon the specifics of the application. The most commonly employed box is a single-gang outlet box, also referred to as a standard outlet box. The single-gang box is ideal for applications in which only one receptacle is required for the application. Standard outlet boxes have opening dimensions of approximately 3"×2¼" and are available in a variety of depths. Double-gang and triple-gang boxes are also available, and they typically have the capacity to hold two and three receptacles respectively. A four inch (4") square box is also commonly employed for multiple receptacle applications.

Typically, outlet boxes are mounted by affixing mounting ears to a wall stud or other structural member. In the usual application, the installer will offset the electrical box when installed on the wall studs in order to compensate for the thickness of any finishing material to be installed. The offset is intended to ensure the open face of the box is aligned flush with the finish material to conform to electrical codes. In addition, for some applications, such as exterior uses, there is a requirement to install electrical boxes on poured concrete walls, wherein the outlet box, may be mounted within a concrete structure. This is accomplished by attaching the box to a form in the desired location. The form is usually a wooden temporary structure used to contain the poured concrete in the desired shape that is removed after the concrete has hardened. The outlet box remains in the concrete after removal of the form.

However, in some applications the offset is insufficient to bring the open face of the box flush with the finish material. In these cases extensions must be installed by the electrician to bridge the gap between the box opening and the surface of the finish material. This can occur, for example, when ceramic or stone tile are added to the sheet rock wall material. the prior art methods for providing an extension after the finish materials are installed involve squeezing the extension between the box and the wall finishing material and using longer than normal screws to install the electrical device such as a switch or receptacle. Alternately, the box may provide additional pretapped holes for affixing an extension which the installer may use for attaching the extension before installing the electrical device. In either case additional time consuming labor is needed to adapt the box for use and compliance with electrical codes.

Therefore, it would be desirable to have an extension for an electrical box that can be easily installed to extend the open front perimeter of the box after the finishing materials are installed such that the perimeter will be flush with the finished wall surface to conform to electrical code requirements.

SUMMARY OF THE INVENTION

Applicant has overcome the shortcomings of prior art electrical outlet boxes by providing an extension device that can be installed within the electrical box and pulled out from the front of the box to increase the depth of the box, once it is set in place without the need for attaching a separate extension.

The present invention therefore provides an electrical outlet box extension comprising a generally rectangular perimetrical side wall with an inner surface and an outer surface having an open front face and an open rear face and defining an interior space. The extension includes at least one outwardly protruding resilient tab located on the side wall outer surface.

More specifically, the present invention provides an electrical outlet box assembly. The assembly includes an electrical outlet box having a back wall, a perimetrical side wall surrounding the back wall, an open front face and a box interior. The side wall includes at least one cavity thereon. An extension includes a perimetrical side wall with an inner surface and an outer surface. The side wall of the extension includes at least one resilient tab. The resilient tab has an outwardly protruding lip adapted for cooperative engagement with the cavity of the outlet box for insertably accommodating the extension in the box.

The box side wall may include a plurality of spaced apart cavities thereon. The resilient tab of the extension is resiliently positionable within one of the pluralities of cavities for adjustably positioning the extension with respect to the box.

DETAILED DESCRIPTION OF THE PREFERRED EMBODIMENTS

There will be detailed below the preferred embodiments of the present invention with reference to the accompanying drawings. Like members are designated by like reference characters in all figures.

Figure 1:
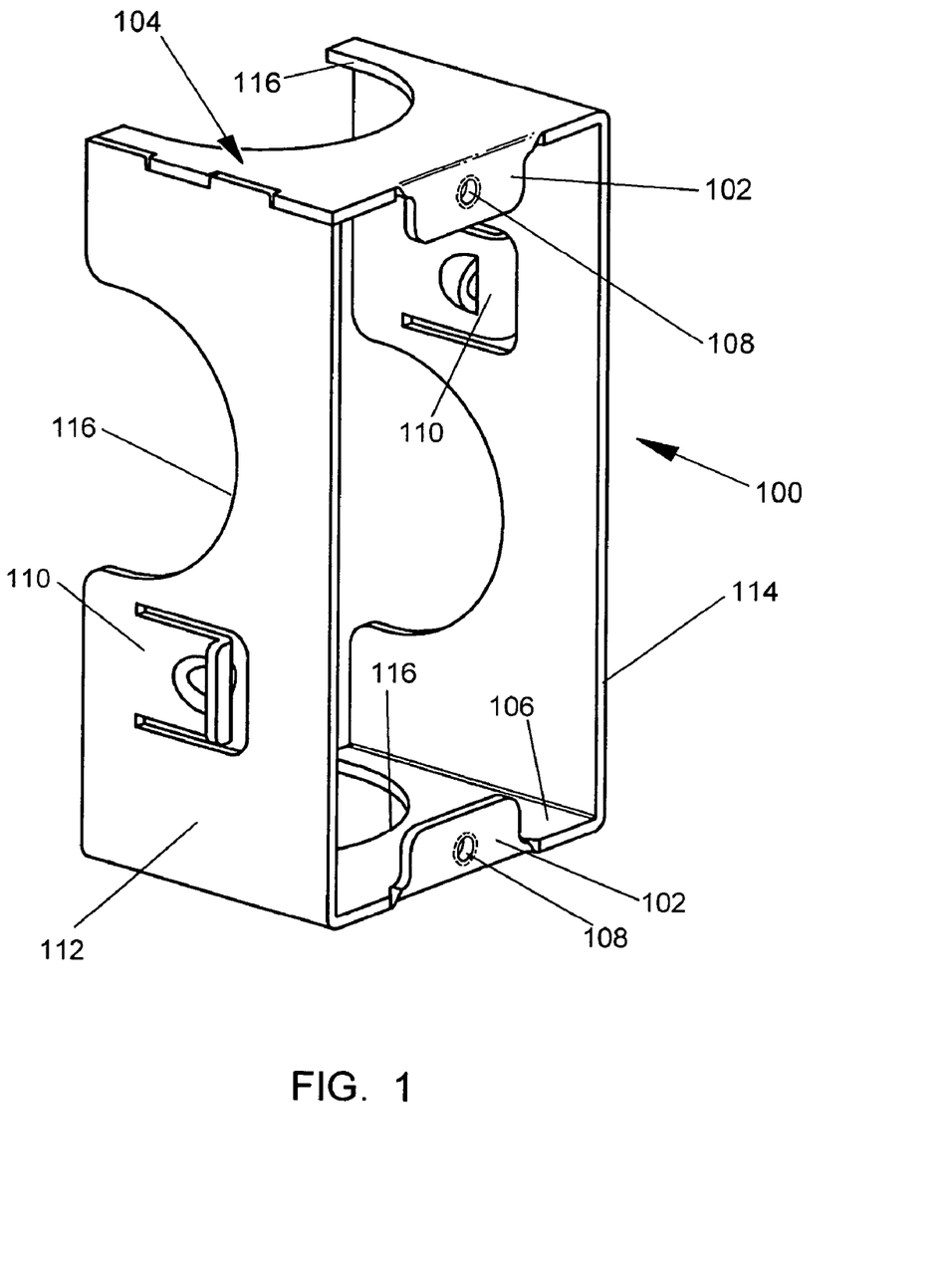
FIG. 1 is a perspective view of the assembled electrical box extension according to the present invention.
Figure 2:
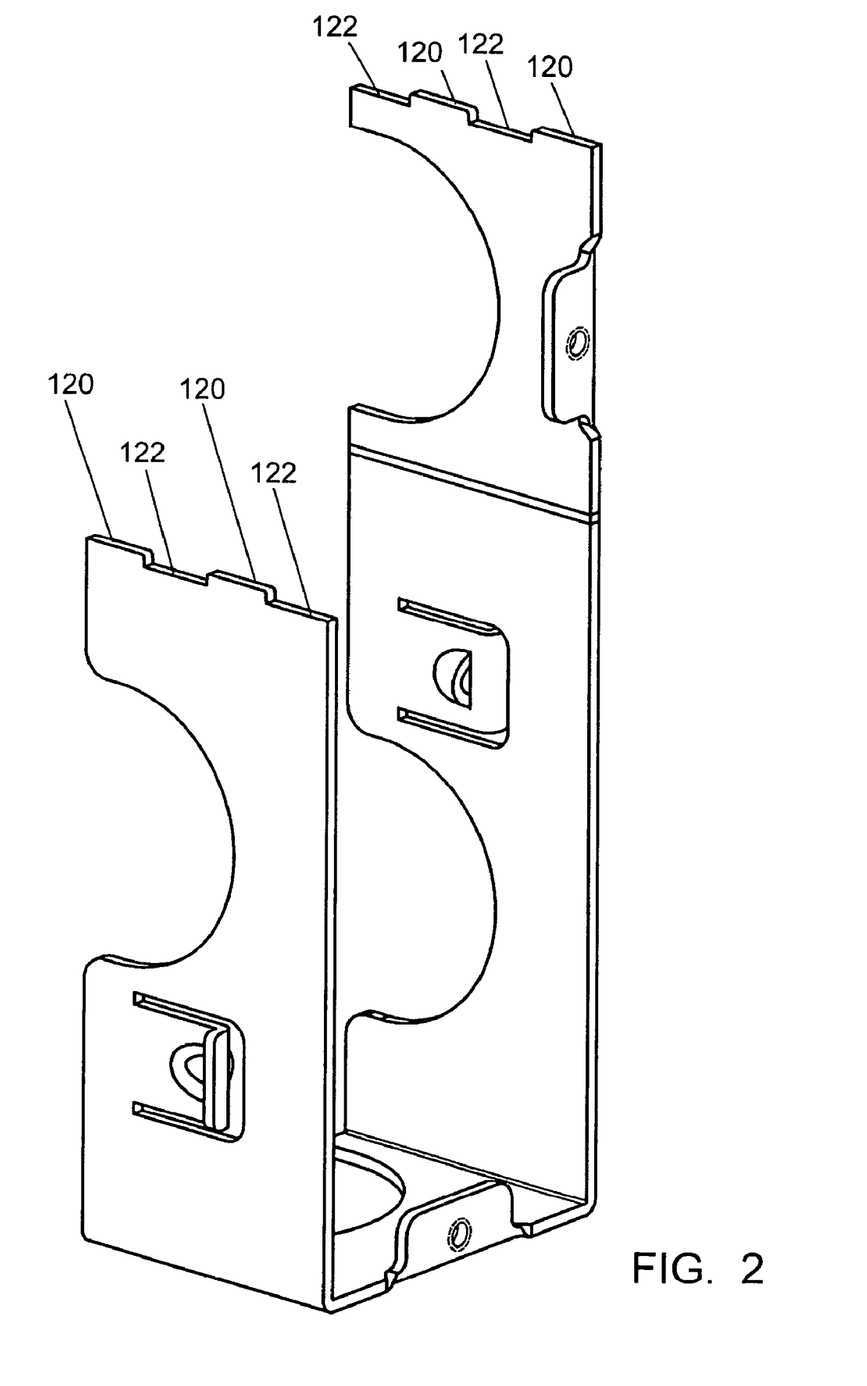
FIG. 2 is a perspective view of the partially assembled electrical box extension according to the present invention in an unfolded position.

Turning now to FIGS. 1 and 2, there is shown a perspective view of the outlet box extension according to the present invention. The extension, which is a generally rectangular frame 100, typically made of a metallic material, which may be a folded sheet metal. The extension has ears 102 located on the top 104 and bottom walls 106, each having tapped holes 108 for mounting an electrical device within the electrical box. Because the ears 102 and holes 108 are mounted on the extension frame 100 the holes 108 are closer to the device that will be installed in the extension allowing the use of shorter screws which provide a stronger and more stable mounting within the electrical box. The extension is held in place by tabs 110, which are resilient deformable structures that protrude from the side wall 112 and 114 of frame 100. The tabs 110 are snapped into cavities in the electrical box as will be shown in FIG. 3-6. Also shown in FIG. 1 are generally hemispherical notches 116, which are placed to clear the space in the box adjacent to knockouts and therefore allow penetration and insertion of conduit and connectors within the box.

Referring specifically to FIG. 2, there is shown the extension according to the present invention wherein the extension frame 100 is depicted in an unfolded view in order to more clearly show the locking mechanism for holding together the folded sheet metal material. As shown the locking system is made up of teeth 120 and notches 122 for cooperatively engaging each other. This locking system provides a secure attachment that will withstand the pull force during extension but not require a welding operation.

Figure 3:
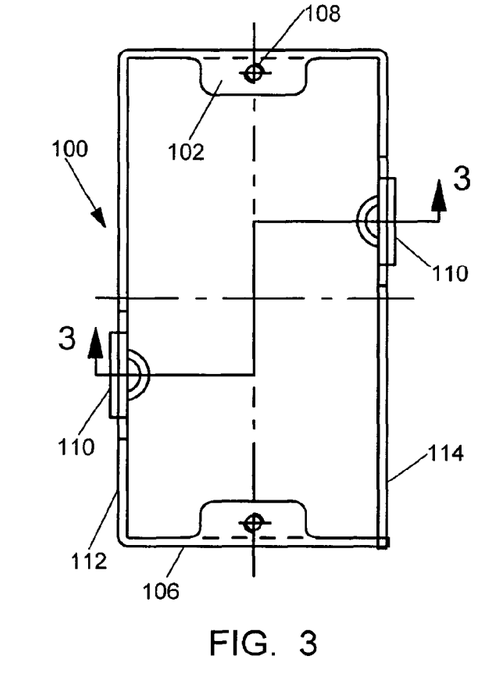
FIG. 3 is a front plan view of the electrical box extension according to the present invention.
Figure 4:
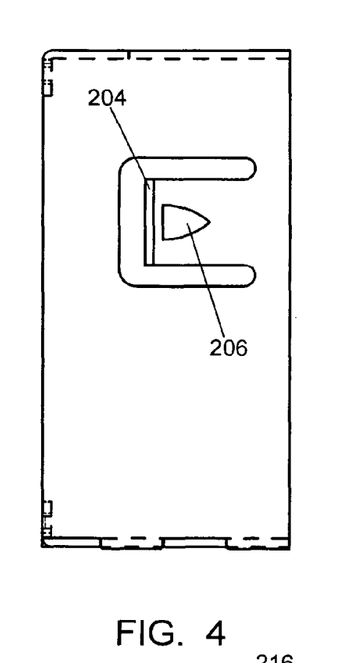
FIG. 4 is a side plan view of the electrical box extension according to the present invention.

Turning now to FIGS. 3-6, the extension frame 100 according to the present invention is shown. In the view of FIG. 3, tabs 110 are visible extending from the exterior of sidewall 112 and 114. As more clearly depicted in FIG. 4, the tab 110 is made up of components having an elastic resilient support portion 202 a locking lip 204 for cooperatively engaging a cavity in the electrical box and an embossed opening 206, which may be used by the installer to change the position of locking lip 204 by bending the resilient support portion 202 with a long nose pliers or screw driver.

Figure 5:
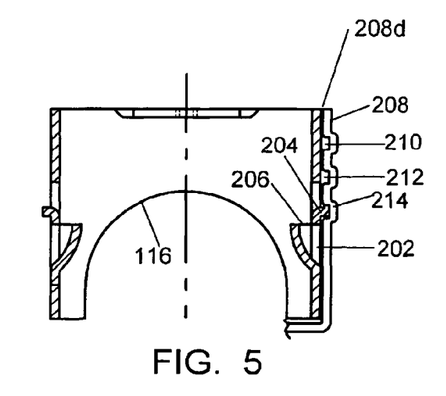
FIG. 5 is a partial cross sectional view of the electrical box extension according to the present invention along section A-A of FIG. 3 with the extension in the retracted position.
Figure 6:
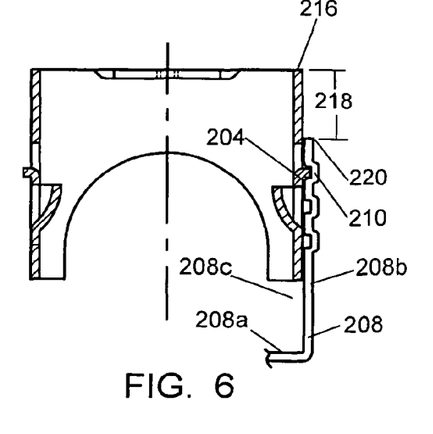
FIG. 6 is a partial cross sectional view of the electrical box extension according to the present invention along section A-A of FIG. 3 with the extension in the extended position.

Referring to FIGS. 5 and 6, the extension frame 100 is shown in position with respect to an electrical box 208. Box 208 may be an assembled outlet box having a back wall 208a, a perimetrical side wall 208b, and a box interior 208c opening to a front face 208d. Electrical box 208 includes cavities 210, 212 and 214. The cavities are located on the inner surface of the box wall. Once the box has been installed with the extension frame 100 nested within the box such that the extension is flush with the box opening, the extension can be pulled outside the box until tab 110 and particularly lip 204 snap into cavities 210, 212 or 214 in the inner surface of the electrical box. By providing several cavities on the inside box wall, the extension can be snapped and adjusted in different positions. Therefore the extension according to the present invention can be used for different thickness finishing material.

In FIG. 5, locking lip 204 is cooperatively engaged in cavity 214, wherein the extension is flush with the electrical box opening. By resiliently deforming resilient support portion 202, lip 204 is disengaged from cavity 214 and extension frame 100 is free to translate with respect to box 208. While not shown in the cross section depicted, it should be understood by one skilled in the art that a complementary tab and cavity are located on the adjacent side wall of electrical box 208 to provide a secure and stable lock.

With reference to FIG. 6, the extension shown is fully extended. The locking lip 204 is cooperatively engaged in cavity 210, wherein the extension is in the fully extended position such that the extension front edge 216 is extended a distance 218 from the front edge 220 of the electrical box. By resiliently deforming resilient support portion 202, lip 204 is disengaged from cavity 214 and extension frame 100 is free to translate with respect to box 208. While not shown in the cross section depicted, it should be understood by one skilled in the art that a complementary tab and cavity are located on the adjacent side wall of electrical box 208 to provide a secure and stable lock. It should be further noted that an intermediate position exists wherein lip 208 would engage cavity 214.

Figure 7:
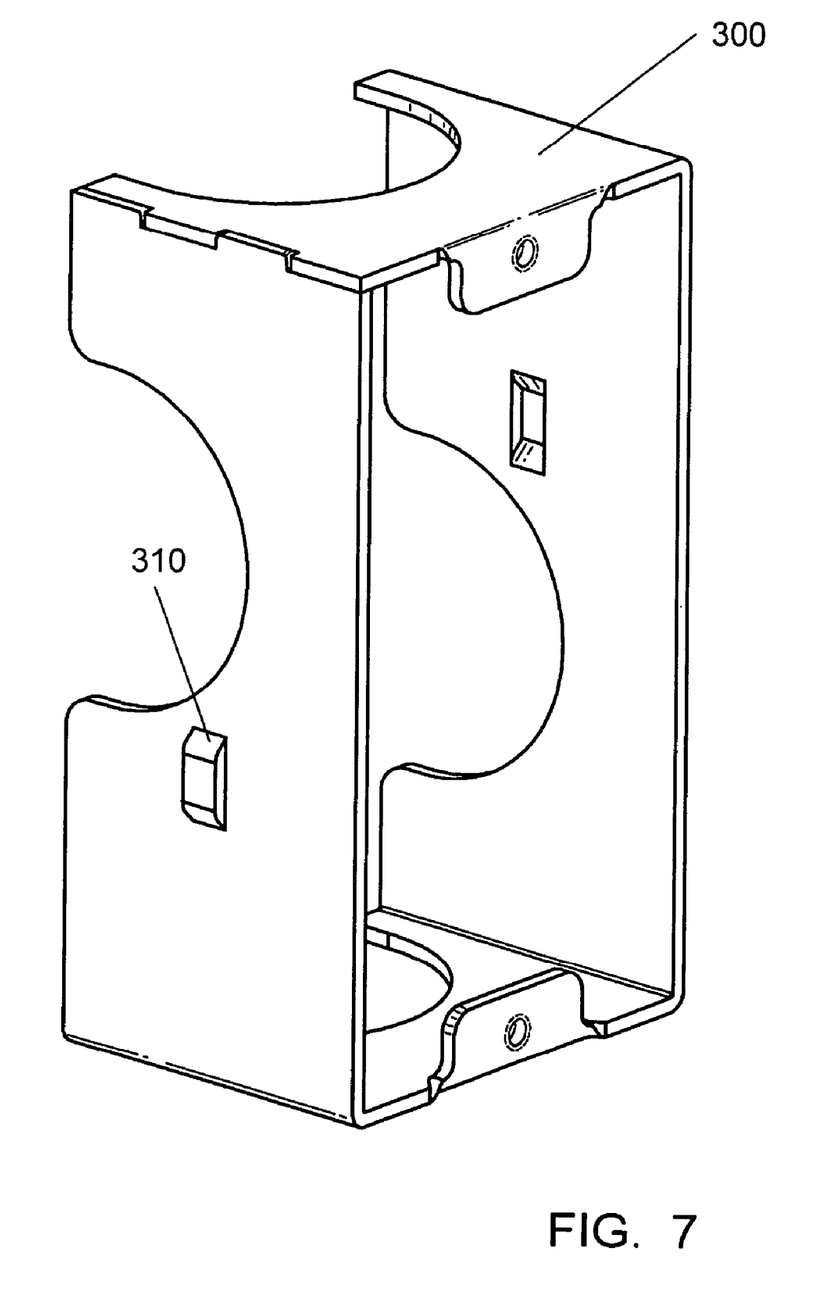
FIG. 7 is a perspective view of an alternate embodiment of the electrical box extension according to the present invention.

Turning to FIG. 7, there is shown an alternate embodiment of the pull out extension according to the present invention, designed to be used for electrical boxes in concrete wall. In this embodiment, the extension 300 is provided with protrusions 310. In this embodiment, the extension must be flush with the electrical box when the box is fastened to a form prior to pouring concrete. After the concrete has hardened and the form removed the box will be flush with the concrete wall. In cases where a finishing material is added to the concrete wall such as ceramic tile or stone, the extension can be pulled out of the box to correspond to the additional depth of the finishing material. The extension 300 according to the present embodiment is held in place by the friction between protrusions 310 and the interior of the box wall. No cavity is provided in the box for the initial nested position, but only for the extended position. This embodiment can be typically used, for example when the thickness of the finishing material is known prior to the installation of the box.

Figure 8:
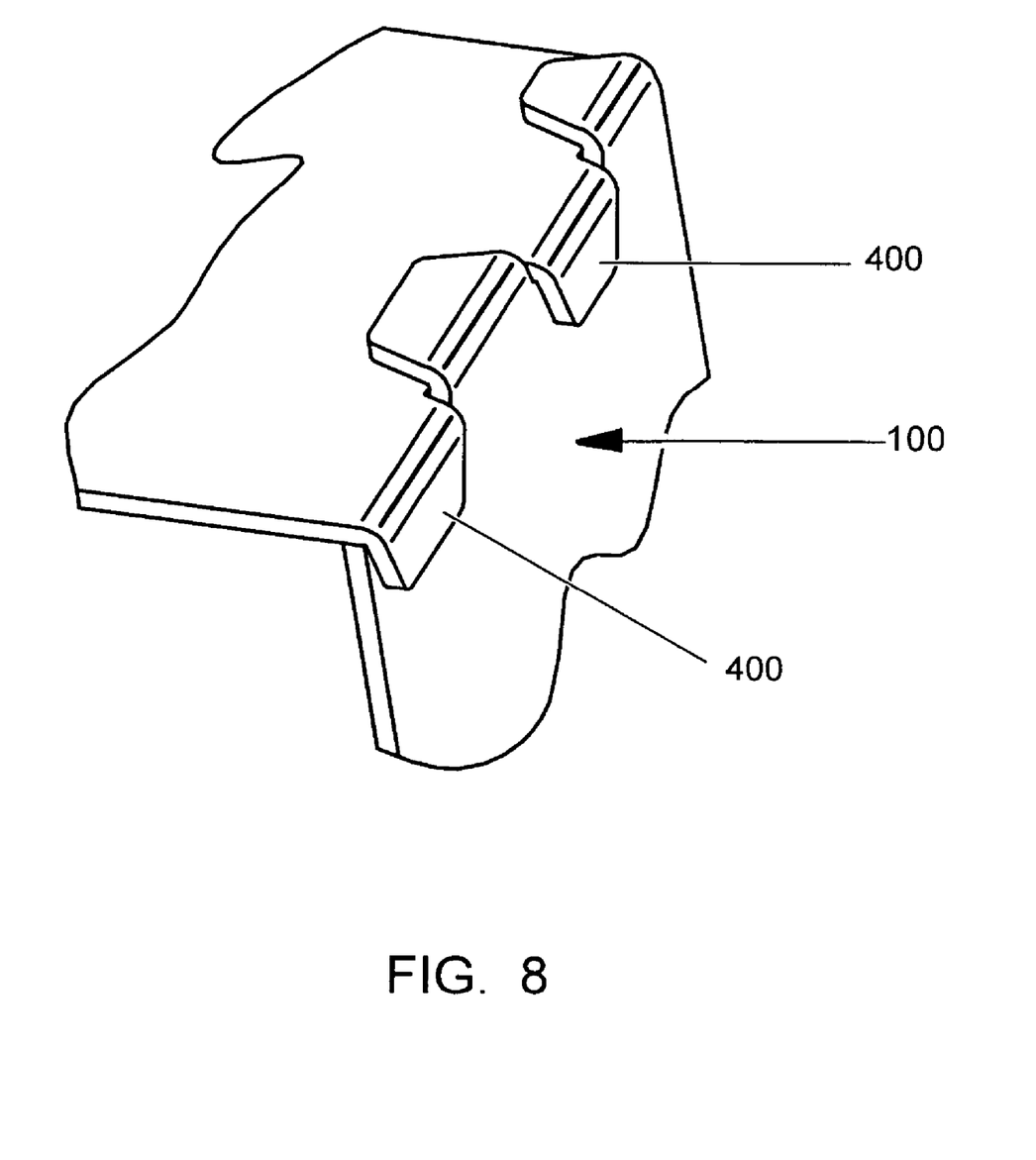
FIG. 8 is a perspective view of an alternate embodiment of a feature of the electrical box extension according to the present invention.

Turning to FIG. 8 there is shown an alternate embodiment of the locking attachment for holding extension frame in the generally rectangular shape. In FIG. 8, there is shown a portion of the extension according to the present invention wherein the extension frame 100 depicted has interwoven locking tabs 400 that cooperatively engage each other at the outside wall the extension frame 100. This locking system provides a secure attachment that will withstand the pull force during extension but not require a welding operation. However, it should be noted that the locking system as depicted could be welded, wherein the locking system can be located in the corner of the extension or on one of the side walls.

Figure 9:
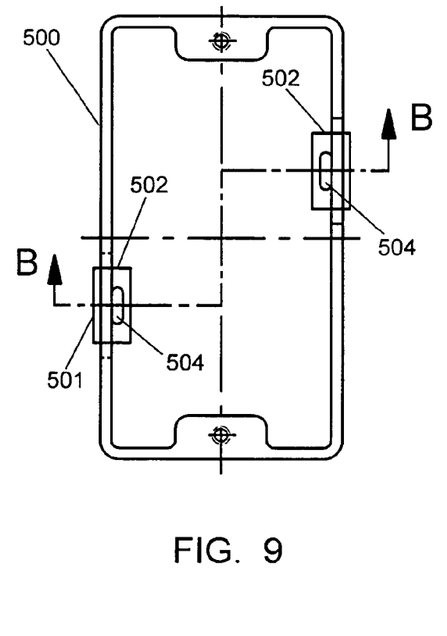
FIG. 9 is a front view of an alternate embodiment of the electrical box extension according to the present invention.

Another alternate embodiment of the present invention is shown FIGS. 9-12. In this embodiment the extension is made of a single unitary plastic part. As shown in FIG. 9, tab 110 extends beyond the outside wall of extension frame 500, and also incorporates a flange 502 on the interior of tab 110. Holes 504 are provided on the flange 502 for use by the installer to resiliently bend the tab 100 to change its position. This can be done with a screw driver or long nose pliers.

Figure 10:
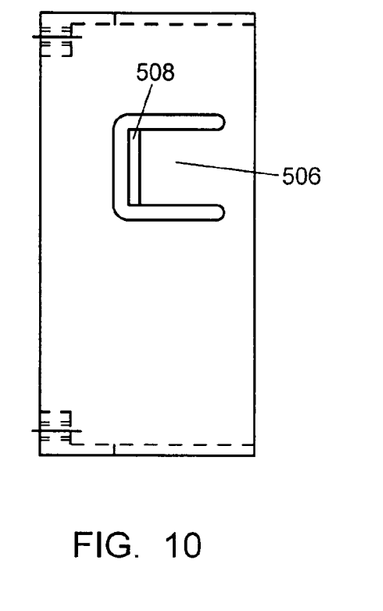
FIG. 10 is a side view of an alternate embodiment of the electrical box extension according to the present invention.

As more clearly depicted in FIG. 10, the tab 501 is made up of components having an elastic resilient support portion 506 a locking lip 505 for cooperatively engaging a cavity in the electrical box.

Figure 11:
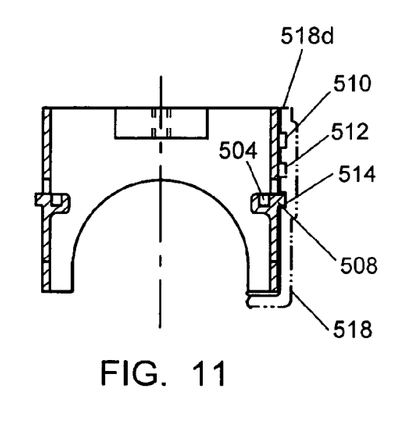
FIG. 11 is a cross sectional view of an alternate embodiment of the electrical box extension according to the present invention along section B-B of FIG. 9 with the extension in the retracted position.
Figure 12:
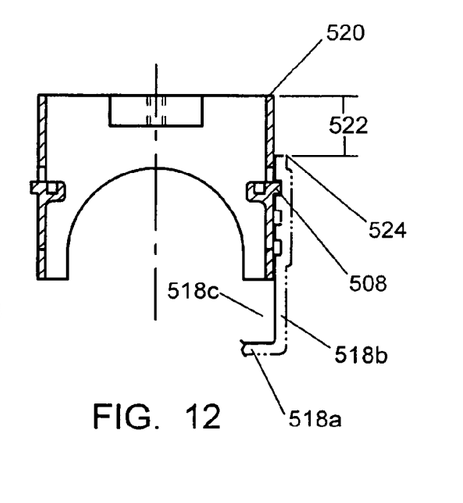
FIG. 12 is a cross sectional view of an alternate embodiment of the electrical box extension according to the present invention along section B-B of FIG. 9 with the extension in the extended position.

Referring to FIGS. 11 and 12, the extension frame 500 is shown in position with respect to electrical box 518 (shown in phantom). Box 518 may be an assembled electrical box having a back wall 518a, a permetrical side wall 518b, a box interior 518c, opening to a front face 518d. Electrical box 518 only includes cavities 510, 512 and 514. The cavities are located on the inner surface of the box wall. Once the box has been installed with the extension frame 500 nested within the box such that the extension is flush with the box opening, the extension can be pulled outside the box until lip 508 snap into cavities 510, 512 or 514 in the inner surface of the electrical box 518. By providing several cavities on the inside box wall, the extension can be snapped and adjusted in different positions. Therefore the extension according to the present invention can be used for different thickness finishing material In FIG. 11, locking lip 505 is cooperatively engaged in cavity 514, wherein the extension is flush with the electrical box opening. By resiliently deforming resilient support portion 506, lip 508 is disengaged from cavity 514 and extension frame 500 is free to translate with respect to box. While not shown in the cross section depicted, it should be understood by one skilled in the art that a complementary tab and cavity are located on the adjacent side wall of electrical box 518 to provide a secure and stable lock.

With reference to FIG. 12, the extension shown is fully extended. The locking lip 508 is cooperatively engaged in cavity 510, wherein the extension is in the fully extended position such that the extension front edge 520 is extended a distance 522 from the front edge 524 of the electrical box 518. By resiliently deforming resilient support portion 506, lip 508 is disengaged from cavity 514 and extension frame 500 is free to translate with respect to box 518. While not shown in the cross section depicted, it should be understood by one skilled in the art that a complementary tab and cavity are located on the adjacent side wall of electrical box 518 to provide a secure and stable lock. It should be further noted that an intermediate position exists wherein lip 508 would engage cavity 514.

Various changes to the foregoing described and shown structures would now be evident to those skilled in the art. Accordingly, the particularly disclosed scope of the invention is set forth in the following claims.

The invention claimed is:

1. An electrical outlet box assembly comprising:
   an electrical outlet box including a box having a back wall, a perimetrical side wall surrounding said back wall defining an open front face and a box interior, said side wall having at least two cavities thereon and a plurality of spaced apart cavities on said side wall; and
   an extension including a perimetrical side wall with an inner surface and an outer surface having an open front face and an open rear face and defining an interior space, having at least one resilient tab located on said side wall outer surface, said resilient tab further having an outwardly protruding lip resiliently positionable in and adapted to cooperatively engage either of said at least two cavities or one of said plurality of cavities of said outlet box for insertably accommodating and adjustably positioning said extension in and with respect to said box.

2. An electrical outlet box assembly of claim 1 wherein said box and said extension have a generally rectangular configuration.

3. An electrical outlet box assembly of claim 2 wherein said extension is formed from flat sheet metal folded into said rectangular configuration.

4. An electrical outlet box assembly of claim 3 wherein said flat sheet metal is joined by a dovetail joint.

5. An electrical outlet box assembly of claim 3 wherein said sheet metal is joined by overlapping interwoven tabs.

6. An electrical outlet box assembly comprising:
   an electrical outlet box including a box having a back wall, a perimetrical side wall surrounding said back wall defining an open front face and a box interior, said side wall having a plurality of spaced apart cavities thereon; and
   an extension including a perimetrical side wall with an inner surface and an outer surface having an open front face and an open rear face and defining an interior space, having at least one resilient tab located on said side wall outer surface, said resilient tab further having an outwardly protruding lip, wherein said at least one resilient tab of said extension is resiliently positionable and adapted to cooperatively engage one of said plurality of spaced apart cavities of said outlet box for insertably accommodating and adjustably positioning said extension in and with respect to said box.

7. An electrical outlet box assembly of claim 6 wherein said box and said extension have a generally rectangular configuration.

8. An electrical outlet box assembly of claim 7 wherein said extension is formed from flat sheet metal folded into said rectangular configuration.

9. An electrical outlet box assembly of claim 8 wherein said flat sheet metal is joined by a dovetail joint.

10. An electrical outlet box assembly of claim 8 wherein said sheet metal is joined by overlapping interwoven tabs.

* * * * *